United States Patent
Kim (10) Patent No.: US 8,793,858 B2
(45) Date of Patent: Aug. 5, 2014

(54) ALIGNMENT LAYER, LIQUID CRYSTAL DISPLAY DEVICE, AND METHOD OF FABRICATING THE SAME

(75) Inventor: Dong-Guk Kim, Goyang (KR)

(73) Assignee: LG Display Co., Ltd., Seoul (KR)

( * ) Notice: Subject to any disclaimer, the term of this patent is extended or adjusted under 35 U.S.C. 154(b) by 402 days.

(21) Appl. No.: 12/963,177

(22) Filed: Dec. 8, 2010

(65) Prior Publication Data

US 2011/0141417 A1  Jun. 16, 2011

(30) Foreign Application Priority Data

Dec. 10, 2009 (KR) .................. 10-2009-0122775

(51) Int. Cl.
  *H01S 4/00* (2006.01)
(52) U.S. Cl.
  USPC ............. 29/458; 349/123; 349/128; 29/592.1
(58) Field of Classification Search
  USPC ......... 29/458, 592.1; 349/123, 124, 127, 129, 349/128
  See application file for complete search history.

(56) References Cited

U.S. PATENT DOCUMENTS

| | | | | |
|---|---|---|---|---|
| 5,953,091 A | * | 9/1999 | Jones et al. | 349/129 |
| 6,217,955 B1 | | 4/2001 | Coates et al. | |
| 2005/0200793 A1 | * | 9/2005 | Moon et al. | 349/141 |
| 2008/0002134 A1 | * | 1/2008 | Jeong | 349/153 |

FOREIGN PATENT DOCUMENTS

| CN | 1869779 A | 11/2006 |
|---|---|---|
| KR | 10-0486010 B1 | 9/2005 |

OTHER PUBLICATIONS

Machine Translation of Wang (CN1869779A); Nov. 29, 2006.*
Office Action issued in corresponding Korean Patent Application No. 10-2009-0122775, mailed May 28, 2013, 3 pages.
Office Action issued in corresponding Chinese Patent Application No. 201010596980.8, mailed Nov. 28, 2012.

* cited by examiner

*Primary Examiner* — David Bryant
*Assistant Examiner* — Ryan J Walters
(74) *Attorney, Agent, or Firm* — Brinks Gilson & Lione (57) ABSTRACT

A method of fabricating an alignment layer comprises depositing an alignment material on a substrate, the alignment material including reactive mesogens and a photoinitiator, the reactive mesogen having a mesogen, flexible spacers at ends of the mesogen, and photo-reactive end groups formed at ends of the flexible spacers, applying an electric field to the alignment material in a predetermined direction, and applying UV light to the alignment material applied by the electric field applied thereto to polymerize the photo-reactive end groups with each other.

8 Claims, 6 Drawing Sheets

ALIGNMENT LAYER, LIQUID CRYSTAL DISPLAY DEVICE, AND METHOD OF FABRICATING THE SAME

This application claims the benefit of Korea Patent Application No. 10-2009-0122775, filed on Dec. 10, 2009, the entire contents of which is incorporated herein by reference for all purposes as if fully set forth herein.

BACKGROUND

1. Field of the Invention

The present disclosure relates to a method of fabricating an alignment layer, and particularly, to a method of fabricating an alignment layer capable of alignment-processing an alignment layer by irradiating ultraviolet (UV) light onto reactive mesogens of the alignment layer.

2. Discussion of the Related Art

A liquid crystal display (LCD) device is a transmissive flat panel display device, and is mainly applied to a portable electronic device such as a notebook computer, personal digital assistants (PDA), and mobile phones. Recently, the LCD device has also been applied to a high-definition television (HDTV), a digital television, and a wall-mounted thin television. In addition to LCD devices, many kinds of devices including a plasma display panel (PDP) are being actively developed as flat panel display devices. However, the LCD device is being spotlighted the most among the flat panel display devices owing to massive production and easy driving characteristics, a high picture quality, etc.

In order to implement a uniform brightness and a high contrast ratio of the LCD device, injected LC molecules have to be aligned in a constant direction. The most representative method of aligning LC molecules is an aligning method by rubbing. According to this aligning method by rubbing, polyimide is deposited on a substrate as an alignment layer, and then a rubbing process is performed, thereby forming uniform micro grooves on the surface of the alignment layer. The micro grooves, polyimide molecules aligned by the rubbing process, and LC molecules undergo an intermolecular interaction on the surface of the alignment layer, thereby uniformly aligning the LC molecules on the entire surface of the alignment layer. However, in the aligning method by rubbing, random phase distortion and light scattering occur due to defects of the micro grooves formed on the surface of the alignment layer. This may lower a function of the LCD device. Furthermore, dust and a static electricity occur on the alignment layer by the rubbing process. This may degrade a production yield and damage the substrate.

BRIEF SUMMARY

A method of fabricating an alignment layer comprises: depositing an alignment material on a substrate, the alignment material including reactive mesogens and a photoinitiator, the reactive mesogen having a mesogen, flexible spacers at ends of the mesogen, and photo-reactive end groups formed at ends of the flexible spacers; applying an electric field to the alignment material in a predetermined direction; and applying UV light to the alignment material applied by the electric field applied thereto to polymerize the photo-reactive end groups with each other.

There is also disclosed a method of fabricating a liquid crystal display (LCD) device, the method comprising: providing a first substrate including a plurality of pixels defined by a plurality of gate lines and data lines and thin film transistors (TFTs) arranged at each pixels; forming a first alignment layer on the first substrate; alignment-processing the first alignment layer; providing a second substrate having a color filter layer and a black matrix thereon; forming a second alignment layer on the second substrate; alignment-processing the second alignment layer; and attaching the first and second substrates to each other, wherein at least one of the first and second alignment layers is formed of an alignment material including reactive mesogens and a photoinitiator, the reactive mesogens having a mesogen, flexible spacers at ends of the mesogen, and photo-reactive end groups at ends of the flexible spacers, and at least one of the first and second alignment layers is aligned by irradiating UV light in a state that an electric field has been applied the corresponding alignment layer in a predetermined direction.

The present invention may have the following advantages.

The alignment layer is formed of reactive mesogens, and is alignment-processed by being irradiated with UV light in a state that an electric field has been applied thereto. This may prevent the conventional problems such as damage of the alignment layer due to a rubbing process, or random phase distortion and light scattering due to defects of micro grooves.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

A description will now be given in detail of the embodiments of the present invention, with reference to the accompanying drawings.

For the sake of brief description with reference to the drawings, the same or equivalent components will be provided with the same reference numbers, and description thereof will not be repeated.

The present invention provides an alignment layer formed of a new alignment material rather than the conventional alignment layer such as polyimide. The alignment layer has an alignment direction determined by irradiation of light such as UV light, not by rubbing. This may prevent the conventional problems, such as performance degradation due to random phase distortion and light scattering, and yield decrease of the alignment layer due to the occurrence of dust and a static electricity.

In the present invention, reactive mesogens are used as the alignment layer. The reactive mesogens are liquid crystalline materials including polymerizable end groups, which are monomer molecules having a liquid crystal phase by including a mesogen which has a liquid crystalline property and polymerizable end groups.

Generally, a liquid crystal has both a crystalline alignment characteristic and fluidity. This may allow the liquid crystal to be uniformly formed and easily aligned on a substrate of a large area. By polymerizing the reactive mesogens aligned on the liquid crystal, a cross-linked polymer network may be obtained with maintaining the alignment state of the liquid crystal.

In the present invention, a calamitic mesogen which implements a liquid crystal phase is used as the mesogen. And, polymerizable acrylates or metacrylate groups are used as polymerizable end groups. However, any polymerizable functional groups may be used as the end groups.

Figure 1:
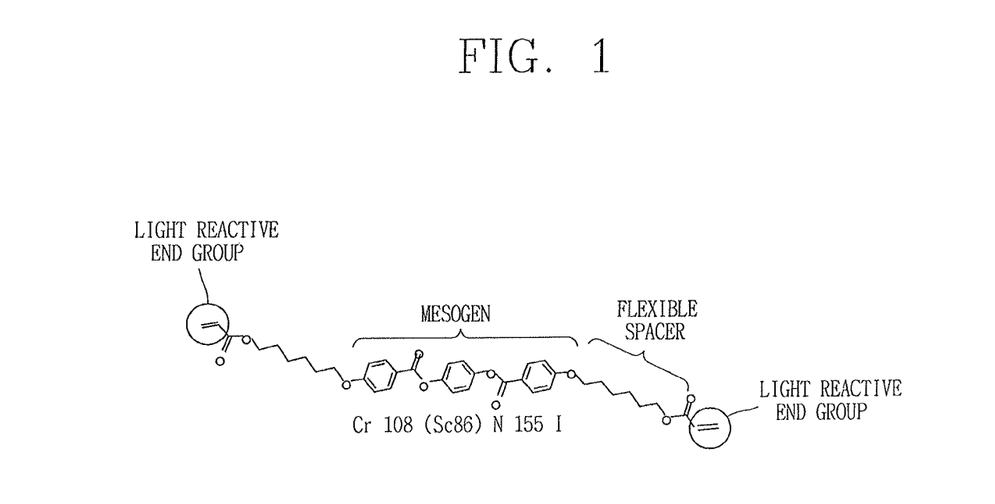
FIG. 1 is a view showing one example of an alignment material according to the present invention.

FIG. 1 is a view showing one example of an alignment material which forms an alignment layer according to the present invention, which shows a structure of reactive mesogens, Cr108(Sc86)N155. As shown in FIG. 1, the reactive mesogens consist of a mesogen, flexible spacers formed at ends of the mesogen, and photo-reactive end groups formed at ends of the flexible spacers.

Figure 2:
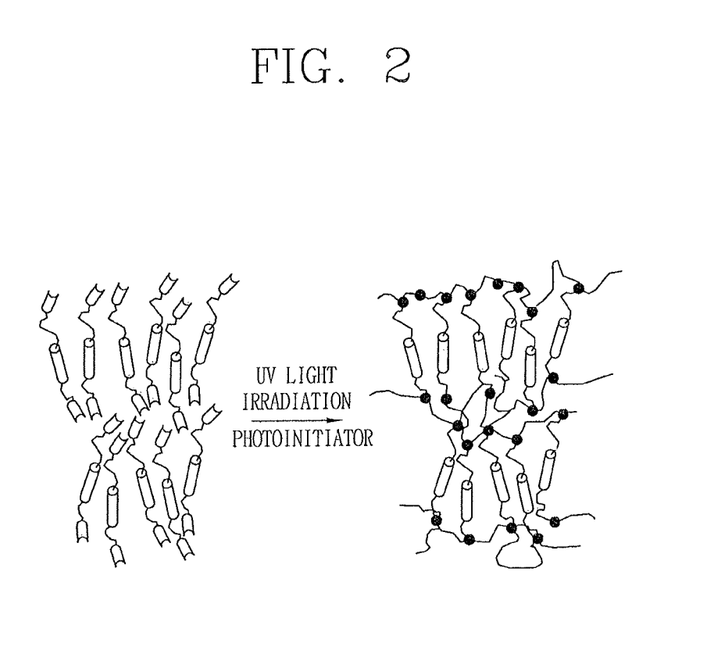
FIG. 2 is a view showing a process for forming a polymer network by polymerizing an alignment material according to the present invention.

As shown in FIG. 2, when UV light is irradiated onto an alignment layer formed of the above alignment material, photo-reactive end groups of the reactive mesogens are polymerized with each other. As a result, the reactive mesogens form a polymer network. For rapid photopolymerization, a photoinitiator is preferably added to the reactive mesogens.

The polymerized reactive mesogens are aligned in one direction. When liquid crystal molecules contact the alignment layer formed of the polymerized reactive mesogens, the liquid crystal molecules are aligned along the polymerized reactive mesogens. Accordingly, the liquid crystal molecules are aligned in a specific direction.

In order to align the liquid crystal molecules in a desired direction, the polymerized reactive mesogens have to be aligned in a desired direction. In order to maintain the aligned state, the polymerized reactive mesogens have to maintain the initial alignment state. In the present invention, the polymerized reactive mesogens are aligned in a desired direction, and an electric field is applied to the alignment layer so as to maintain the aligned state.

More concretely, an electric field is formed in a desired direction (alignment direction of a liquid crystal) by applying a voltage to the alignment layer formed of the reactive mesogens, and then the reactive mesogens are aligned in the direction of the electric field. Under this state, UV light is irradiated to align the polymerized reactive mesogens in a desired direction, and to maintain the aligned state. When applied with the electric field, the reactive mesogens are rotated due to dielectric anisotropy thereof, thus to be aligned along the electric field. Under this state, when irradiated with UV light, the reactive mesogens are moved to the surface of a substrate onto which the UV light is irradiated. Then, the reactive mesogens are polymerized with each other to form a stable liquid crystalline polymer network.

Hereinafter, a exemplary embodiment of a method of fabricating an alignment layer with reactive mesogens, and a method of fabricating a liquid crystal display (LCD) device will be explained in more detail.

Figure 3:
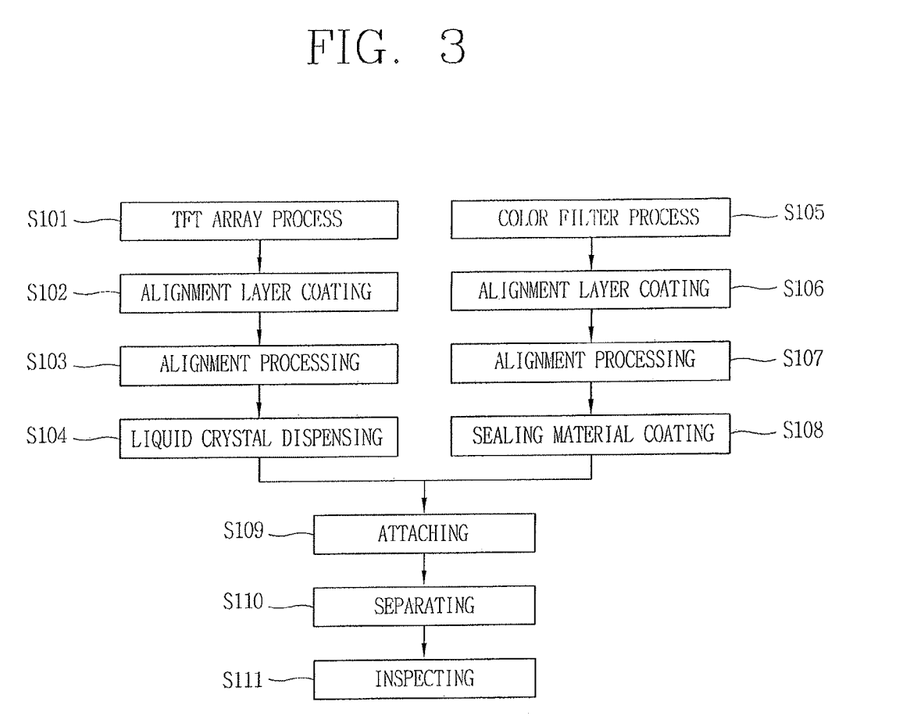
FIG. 3 is a flowchart showing a method of fabricating a liquid crystal display (LCD) device according to the present invention.

FIG. 3 is a flowchart showing a method of fabricating an LCD device according to the embodiment of the present invention.

As shown in FIG. 3, a plurality of gate lines and data lines which define pixel regions are formed on a first substrate by a driving device array process. Then, a thin film transistor, a driving device connected to the gate line and the data line is formed at each pixel region (S101). Then, pixel electrodes and common electrodes connected to the TFTs and configured to drive an LC layer by receiving a signal through the TFTs are formed by the driving device array process.

Then, a color filter layer for implementing R, G and B colors, and a black matrix are formed on a second substrate by a color filter process (S105).

Then, reactive mesogens are respectively deposited on the first and second substrates to form alignment layers. Then, in order to provide an anchoring force or a surface fixing force to liquid crystal molecules of a liquid crystal layer formed between the first and second substrates, UV light is irradiated onto the alignment layers to alignment-process the alignment layers in a state that a voltage has been applied to the alignment layer (S103,S104,S107,S108).

Then, a liquid crystal is dispensed onto the first substrate, and a sealing material is deposited on an outer periphery of the second substrate. Then, the first and second substrates are attached to each other with a pressure (S104,S108,S109). By the pressure, the liquid crystal dispensed onto the first substrate is dispersed to form a liquid crystal layer having a uniform thickness between the first and second substrates. Although not shown, a column spacer is formed on at least one of the first and second substrates, thereby constantly maintaining a cell gap when the first and second substrates are attached to each other.

Each of the first and second substrates is formed of a glass substrate having a large area. More concretely, a plurality of panel regions are formed on a glass substrate having a large area, and a TFT (driving device) and a color filter layer are formed on each panel region. Accordingly, in order to fabricate unit LC panels, the glass substrate has to be cut and processed to be separated into unit LC panels (S110). Then, each of the separated unit LC panels is inspected to fabricate an LCD device (S111).

Figure 4A:
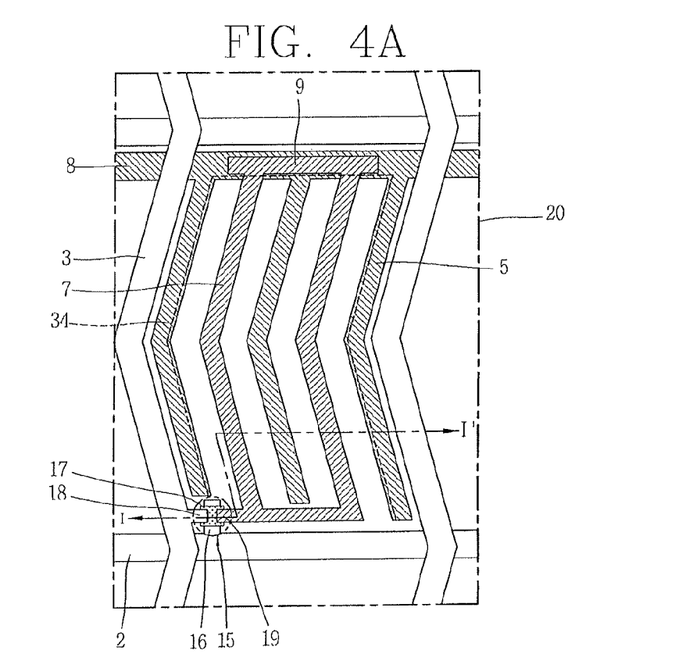
FIG. 4A is a planar view showing a structure of a thin film transistor array substrate of an LCD device according to the present invention.

FIG. 4A is a planar view showing, a structure of a first substrate 20 fabricated by a thin film transistor array process. FIG. 4A shows a structure of an In Plane Switching (IPS) mode. Referring to FIG. 4A, a plurality of pixels are defined on a first substrate 20 by a plurality of gate lines 2 and data lines 3. Even if FIG. 4 shows only the $(n, m)^{th}$ pixel, 'n' gate lines 2 and 'm' data lines 3 are substantially arranged on the first substrate 20, thus to form 'n×m' pixels on the entire region of the first substrate 20. A thin film transistor (TFT) 15 is formed at an intersection between the gate line 2 and the data line 3 inside the pixel.

The TFT 15 consists of a gate electrode 16 which receives a scan signal from the gate line 2, a semiconductor layer 17 formed on the gate electrode 16, and forming a channel layer by being activated when a scan signal is applied thereto, and a source electrode 18 and a drain electrode 19 formed on the semiconductor layer 17 and receiving an image signal through the data line 3. The TFT 15 applies an image signal inputted from outside to the LC layer.

A plurality of common electrodes 5 and pixel electrodes 7 are disposed in the pixel in parallel with the data lines. Here, the common electrodes 5 and the pixel electrodes 7 are curved in the pixel by a predetermined angle at least one time, thereby dividing the pixel into two domains symmetrical to each other. The reason why the pixel is divided into two domains is in order to enhance a viewing angle by symmetrically arranging liquid crystal molecules at the adjacent domains so as to compensate for the viewing angle. Referring to FIG. 4A, the data lines 3 are curved in the pixel like the common electrodes 5 and the pixel electrodes 7. However, the data lines 3 may not be curved in the pixel.

Common lines 8 connected to the common electrodes 5 are disposed at an upper region of the pixel, and pixel electrode lines 9 connected to the pixel electrodes 7 are disposed on the common lines 8. The pixel electrode lines 9 form a storage capacitance together with the common lines 8.

In the IPS mode LCD device, liquid crystal molecules are substantially disposed in parallel with the common electrodes 5 and the pixel electrodes 7. Once a signal is applied to the pixel electrode 7 as the TFT 10 is operated, a horizontal electric field substantially parallel to an LC panel 1 is generated between the common electrodes 5 and the pixel electrodes 7. The liquid crystal molecules are rotated on the same plane along the horizontal electric field. Accordingly, greyscale inversion due to refractive anisotropy of the liquid crystal molecules may be prevented.

Figure 4B:
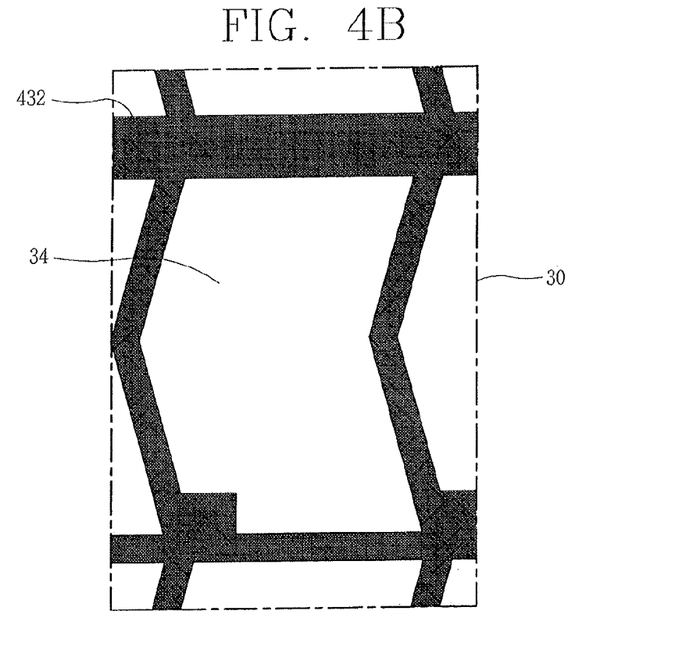
FIG. 4B is a planar view showing a structure of a color filter substrate of an LCD device according to the present invention.

FIG. 4B is a planar view showing a structure of a color filter formed on a second substrate by a color filter process according to the present invention.

As shown in FIG. 4B, a black matrix 32 and a color filter layer 34 are formed on a second substrate 30. The black matrix 32 serves to prevent light leakage to an image non-display region of an LCD device, and is implemented in the form of matrixes on a region corresponding to the region of the first substrate 20 where the gate lines 2, the data lines 3 and the TFTs 15 have been formed. And, the color filter layer 34 serves to substantially implement colors, and is formed at a region encompassed by the black matrix 32.

Figure 5:
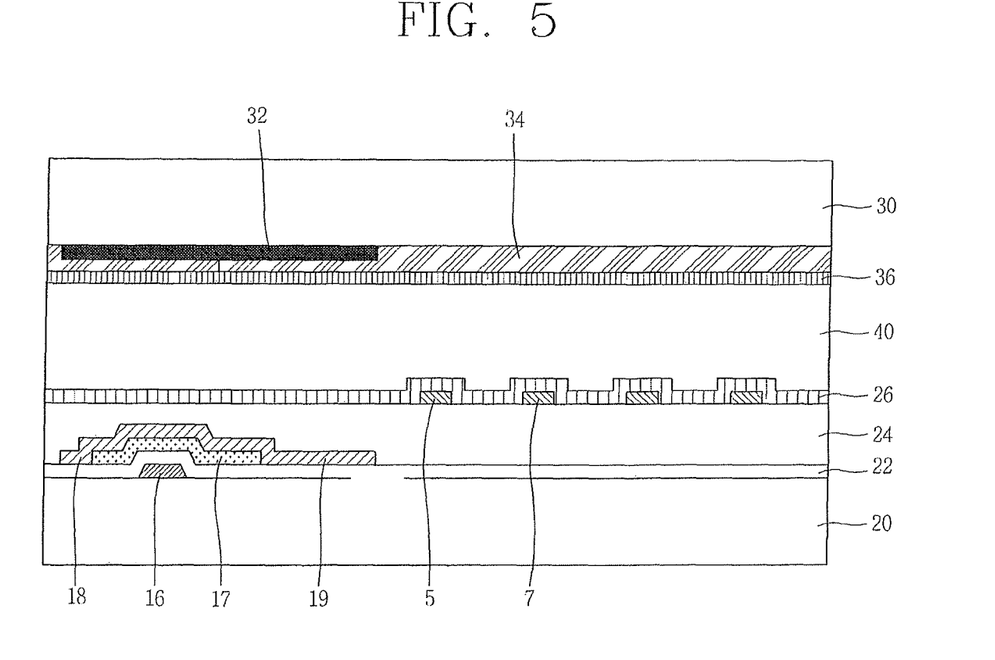
FIG. 5 is a sectional view of an LCD device according to the present invention.

FIG. 5 is a sectional view of an LC panel fabricated by attaching the first substrate 20 and the second substrate 30 to each other. Hereinafter, a structure of the LC panel will be explained in more detail with reference to FIG. 5.

As shown in FIG. 5, a gate electrode 16 is formed on the first substrate 20, and a gate insulation layer 22 is laminated on an entire region of the first substrate 20. A semiconductor layer 17 is formed on the gate insulation layer 22, and a source electrode 18 and a drain electrode 19 are formed on the semiconductor layer 17. A passivation layer 24 is formed on the entire region of the first substrate 20. At least one pair of common electrodes 5 and pixel electrodes 7 are disposed on the passivation layer 24 in parallel with each other.

The passivation layer 24 is formed of an organic material such as Benzo Cyclo Butene (BCB) or photo acryl, or an organic material such as $SiO_2$ or $SiNx$. And, the common electrodes 5 and the pixel electrodes 7 are formed of transparent electrodes such as Indium Tin Oixde (ITO) or Indium Zinc Oxide (IZO). Here, the common electrodes 5 and/or the pixel electrodes 7 may be formed of opaque metallic materials such as Cr, Mo, Al, or Al alloy.

In the drawing, the common electrodes 5 and the pixel electrodes 7 are formed on the passivation layer 24. However, the common electrodes 5 and the pixel electrodes 7 may be formed on the first substrate 20 or the gate insulation layer 22 rather than the passivation layer 24.

A black matrix 32 and a color filter layer 34 are formed on the second substrate 30. The black matrix 32 serves to prevent light leakage to a region where liquid crystal molecules are not driven. As shown, the black matrix 32 is mainly formed at a region of a TFT 16, and between pixels (i.e., gate line and data line regions). The color filter layer 34 consists of R(Red), B(Blue) and G(Green), and serves to substantially implement colors. An LC layer 40 is formed between the first substrate 20 and the second substrate 30, thereby completing an LC panel.

A first alignment layer 26 and a second alignment layer 36 are formed on the first substrate 20 and the second substrate 30, respectively. The first alignment layer 26 and the second alignment layer 36 are alignment-processed to align liquid crystal molecules of the LC layer 40 adjacent thereto in a desired direction, and controls the transmittance of light passing through the LC layer 40, thereby implementing images.

As aforementioned, the first alignment layer 26 and the second alignment layer 36 are formed of reactive mesogens, and are alignment-processed by forming a polymer network as photo-reactive end groups of the reactive mesogens are polymerized with each other when irradiated with UV light. A method of alignment-processing the alignment layers 26 and 36 at the time of fabricating an LCD device will be explained in more detail.

Figure 6A:
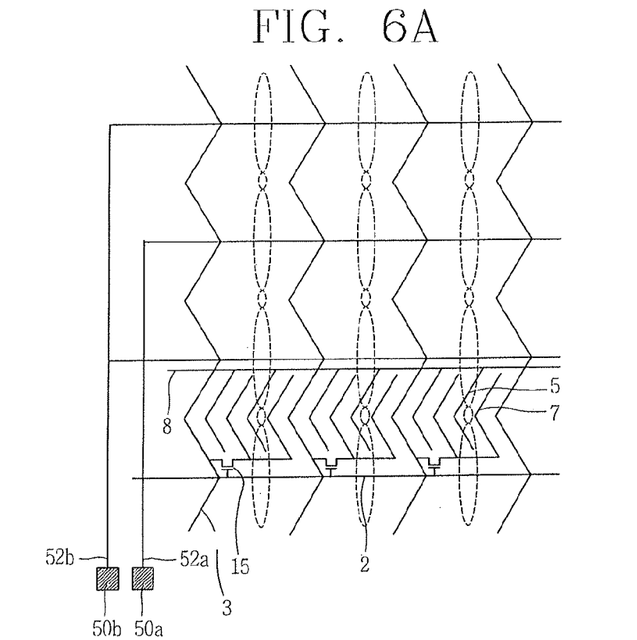
FIG. 6A is a view showing an alignment-processing with respect to an alignment layer formed on a thin film transistor (TFT) array substrate of an LCD device according to the present invention.

FIG. 6A is a view showing an alignment-processing with respect to an alignment layer formed on a first substrate 20 where a TFT has been formed according to the present invention. As shown in FIG. 6A, an alignment material implemented by adding a photoinitiator to reactive mesogens is deposited on the first substrate 20 where a TFT array has been formed. The array formed on the first substrate 20 has the same structure as that of FIG. 4. However, FIG. 6 conceptually illustrates the array for convenience.

As shown, a plurality of gate lines 2 and date lines 3 are arranged on the first substrate 20, and TFTs 15 are arranged in a pixel. In the pixel, are arranged common electrodes 5 and pixel electrodes 7 for dividing the pixel into two domains by being curved at least one time.

A first connection line 52a and a second connection line 52b are connected to an odd numbered gate line and an even numbered gate line, respectively, thereby being connected to a first pad 50a and a second pad 50b. Voltages are applied to the first pad 50a and the second pad 50b from outside, thereby being applied to the odd numbered gate line and the even numbered gate line through the first connection line 52a and the second connection line 52b. More concretely, when voltages having a predetermined potential difference are applied to the first pad 50a and the second pad 50b, an electric field (E) is generated between the odd numbered gate line and the even numbered gate line by the potential difference. The electric field (E) is formed in a direction perpendicular to the gate lines 2.

Reactive mesogens 70 of the alignment material are aligned on the first substrate 20 by the electric field (E) along the direction of the electric field (E). Under this state, when UV light is irradiated onto the first substrate 20, photo-reactive end groups of the reactive mesogens 70 are polymerized with each other. As a result, a polymer network is formed in a direction perpendicular to the gate lines 2.

The first pad 50a, the second pad 50b, the first connection line 52a, and the second connection line 52b are cut to be removed when the first substrate 20 is processed to be separated into unit LC panels. Accordingly, the first pad 50a, the second pad 50b, the first connection line 52a, and the second connection line 52b are not disposed on the separated unit LC panel.

Since the polymerized reactive mesogens 70 are aligned in a direction perpendicular to the gate lines 2, the liquid crystal molecules of the LC layer 40 are aligned along the alignment direction of the polymerized reactive mesogens 70. And, the common electrodes 5 and the pixel electrodes 7 are formed in a predetermined angle from the gate lines 2. More concretely, an alignment direction of the liquid crystal molecules, and a direction of an electric field between the common electrodes 5 and the pixel electrodes 7 are formed in a predetermined angle. When an electric field is formed between the common electrodes 5 and the pixel electrodes 7 as a voltage is applied to the pixel electrodes 7, the liquid crystal molecules aligned in the alignment direction of the polymerized reactive mesogens 70 are switched along the electric field direction. This may control the transmittance of light passing through the LC layer 40.

In a state that the alignment direction of the liquid crystal molecules maintains a predetermined angle from the common electrodes 5 and the pixel electrodes 7, the liquid crystal molecules are switched according to an applied voltage. Accordingly, the common electrodes 5 and the pixel electrodes 7 may be curved in the pixel as shown. Alternatively, the common electrodes 5 and the pixel electrodes 7 may not be curved in the pixel, but may be slantingly formed with a predetermined angle from the gate lines 2.

In the drawing, a voltage for alignment-processing is applied to the gate lines 2. However, the voltage may be applied to the common lines 8. More concretely, the first pad 50a is connected to the odd numbered common line through the first connection line 52a, and the second pad 50b is connected to the even numbered common line through the second connection line 52b, thereby applying a voltage having a potential difference to the odd numbered common line and the even numbered common line. Under this configuration, once an electric field is formed at the odd numbered common line and the even numbered common line, the common lines 8 are disposed in parallel with the gate lines 2. Accordingly, UV light is irradiated to the reactive mesogens in a state that the reactive mesogens are aligned in a direction perpendicular to the gate lines 2. This may form a stable polymer network in a direction perpendicular to the gate lines 2.

Figure 6B:
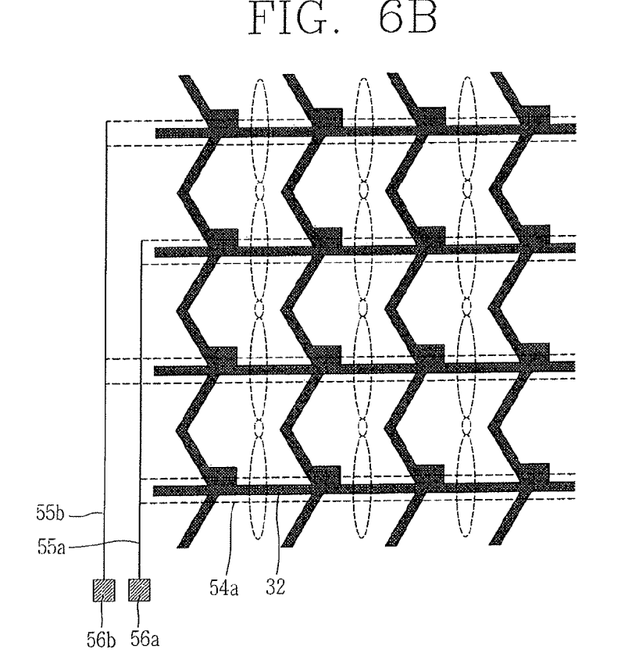
FIG. 6B is a view showing an alignment-processing with respect to an alignment layer formed on a color filter substrate of an LCD device according to the present invention.

FIG. 6B is a view showing an alignment-processing with respect to an alignment layer formed on the second substrate 30 where a color filter has been formed. As shown in FIG. 6B, a black matrix 32 and a color filter layer 34 are formed on the second substrate 30.

The black matrix 32 is formed at a region corresponding the region of the first substrate 20 where the gate lines 2, the data lines 3 and the TFTs 15 are formed. A voltage apply line 54a is formed at the black matrix formed at a region corresponding to the odd numbered gate line, and a voltage apply line 54b is formed at the black matrix formed at a region corresponding to the even numbered gate line.

The voltage apply lines 54a and 54b are connected to third and fourth pads 56a and 56b through third and fourth connection lines 55a and 55b. The voltage apply lines 54a and 54b may be formed of transparent conductive materials such as ITO or IZO, or may be formed of opaque metallic materials such as Mo, Cr, Ti, Al, and Al alloy. The third and fourth pads 56a and 56b apply voltages received from outside to the odd numbered voltage apply line 54a and the even numbered voltage apply line 54b, through the third and fourth connection lines 55a and 55b. More concretely, once voltages having a potential difference are applied to the third and fourth pads 54a and 54b, an electric field is generated by the potential difference between the odd numbered voltage apply line 54a and the even numbered voltage apply line 54b. This electric field (E) is formed in a direction perpendicular to the voltage apply lines 54a and 54b.

In the drawings, the voltage apply lines 54a and 54b are formed to have a width wider than that of the black matrix 32 for convenience. The voltage apply lines 54a and 54b may be formed below or above the black matrix 32 with a width equal to or narrower than that of the black matrix 32.

Generally, the black matrix 32 is formed of an opaque metallic material such as black resin or $CrOx$ or $CrO_2$. When the black matrix 32 is formed of an opaque metallic material such as $CrOx$ or $CrO_2$, the connection lines may be directly connected to the black matrix 32 for voltage apply without additional voltage apply lines.

The reactive mesogens 70 of the alignment material are aligned on the second substrate 30 by the electric field (E) along the direction of the electric field (E). Under this state, once UV light is irradiated onto the second substrate 30, photo-reactive end groups of the reactive mesogens 70 are polymerized with each other. As a result, a polymer network is formed in a direction perpendicular to the voltage apply lines.

The third pad 54a, the second pad 54b, the third connection line 55a, and the fourth connection line 55b are cut to be removed when the second substrate 30 is processed to be separated into unit LC panels. Accordingly, the third pad 54a, the second pad 54b, the third connection line 55a, and the fourth connection line 55b are not disposed on the separated unit LC panel.

As aforementioned, in the present invention, alignment layers formed of reactive mesogens are deposited on the first and second substrates 20 and 30 Then, UV light is irradiated onto the alignment layer in a state that an electric field has been applied thereto. This may allow the polymerized reactive mesogens to be aligned in a set direction. As shown in FIG. 4, when the first and second alignment layers 26 and 36 formed of the polymerized reactive mesogens are formed on the first and second substrates 20 and 30, an LC is injected between the first and second substrates 20 and 30 to form the LC layer 40. As LC molecules of the LC layer 40 interact with the polymerized reactive mesogens of the first and second alignment layers 26 and 36, the LC molecules are aligned along an alignment direction of the polymerized reactive mesogens.

More concretely, in a state that a voltage has not been applied to the common electrodes 5 and the pixel electrodes 7 of the LC panel, the LC molecules of the LC layer 40 are aligned in a direction perpendicular to the gate lines 2 along an alignment direction of the polymerized reactive mesogens. However, when an electric field is formed between the common electrodes 5 and the pixel electrodes 7 as a voltage is applied to the pixel electrodes 7, the LC molecules aligned in a direction perpendicular to the gate lines 2 are rotated by an electric field formed perpendicularly to the pixel electrodes 7. Accordingly, the transmittance of light passing through the LC layer 40 is controlled to implement images.

As aforementioned, in the present invention, a voltage is applied to each LC panel formed on the first and second substrates 20 and 30 through a pad to form an electric field. Then, UV light is irradiated onto the alignment layers in a state that the reactive mesogens of the alignment layers have been aligned, thereby alignment-processing the alignment layers.

Figure 7:
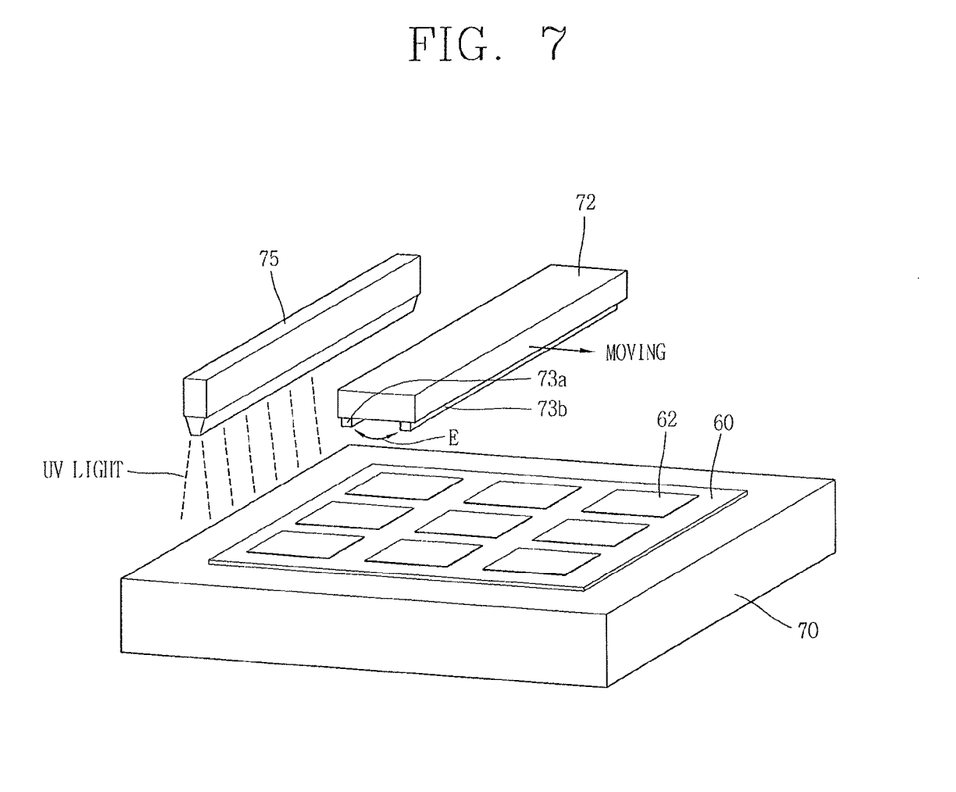
FIG. 7 is a view showing an alignment-processing with respect to an alignment layer formed on a mother substrate having a plurality of panel regions.

FIG. 7 is a view showing an alignment-processing with respect to an alignment layer formed on a mother substrate having a plurality of panel regions according to another embodiment of the present invention. In the alignment-processing method shown in FIGS. 6A and 6B, after a voltage is applied to each LC panel, UV light is irradiated to the LC panel thus to alignment-process the alignment layer. However, in the alignment-processing method shown in FIG. 7, UV light is irradiated to a plurality of LC panels to which an electric field has been applied from outside, thereby alignment-processing the plurality of LC panels at one time.

As shown in FIG. 7, a mother substrate 60 having a plurality of panel regions 62 is loaded onto a table 70. The panel regions 62 may have the structure shown in FIG. 4A by a TFT array process, or may have the structure shown in FIG. 4B by a color filter process.

In the drawings, the panel regions 62 are arranged in 3×3 on the mother substrate 60. However, the panel regions 62 may be variously arranged according to a size of the mother substrate 60 and a size of the panel regions 62.

In a state that the mother substrate 60 has been loaded onto the table 70, an electric field apply unit 72 and a UV irradiation device 75 are arranged above the table 70. The electric field apply unit 72 is formed to have a constant width, and is formed to have a nearly same length as a width of the mother substrate 60. A first electrode 73a and a second electrode 73b spacing from each other and having a constant width are extending from a lower surface of the electric field apply unit 72 along a lengthwise direction of the electric field apply unit 72. The UV irradiation device 75 is formed to have a similar length to the mother substrate 60.

In a state that the electric field apply unit 72 has been disposed above the table 70, a voltage is applied to the first and second electrodes 73a and 73b to form an electric field (E) between the first and second electrodes 73a and 73b. Under this state, the electric field apply unit 72 is moved to another side of the table 70 from one side for scanning. Here, the table 70 may be moved for scanning in a state that the electric field apply unit 72 is in a fixed state. Since the length of the electric field apply unit 72 is nearly same as the width of the mother substrate 60, an electric field is applied to an entire part of the mother substrate 60 by scanning. As the electric field is applied to the entire part of the mother substrate 60, reactive mesogens of the alignment layer deposited on the plurality of panel regions 62 of the mother substrate 60 are aligned along a direction of the electric field.

The UV irradiation device 75 is arranged near the electric field apply unit 72, and is moved together with the electric field apply unit 72. By moving the electric field apply unit 72 or the table 70, an electric field is applied to the panel regions 62 of the mother substrate 60. Under this state, UV is scanned on the entire region of the mother substrate 60, thereby polymerizing the reactive mesogens on the plurality of panel regions of the mother substrate 60. This may form a network of LC molecules aligned along the electric field direction.

The mother substrate having the alignment-processed alignment layer is attached to another mother substrate. Then, the mother substrates are cut into unit panel regions, and an LC is injected between the two mother substrates, thereby forming LC panels.

Alternatively, an LC may be dispensed onto the panel regions of the mother substrate having the alignment-processed alignment layer, and the mother substrate may be attached to another mother substrate. Then, an LC may be dispensed onto an entire part of the panel regions of the attached substrates. Then, the mother substrates may be cut into unit panel regions, thereby forming LC panels.

As aforementioned, in the present invention, the alignment layer is formed of reactive mesogens, and UV light is irradiated onto the alignment layer in a state that an electric field has been applied thereto. This alignment-processing method may prevent random phase distortion and light scattering due to defects of micro grooves, or may prevent damage of the alignment layer due to the conventional rubbing process.

In the aforementioned description, devices having specific structures are used to alignment-process the alignment layer. However, the present invention is not limited to this. That is, any electric field apply means or UV irradiation means capable of applying an electric field to the alignment layer formed of reactive mesogens and capable of irradiating UV light to the alignment layer may be applied to the present invention.

In the aforementioned description, an LCD device having a specific structure is disclosed. However, the present invention may be applied to various LCD devices. For instance, the detailed description discloses an IPS mode LCD device. However, the present invention is not limited to this, but may be applied to a Twisted Nematic (TN) mode LCD device or a Vertical Alignment (VA) mode LCD device.

In the aforementioned description, all of the alignment layers formed on the first and second substrates are formed of reactive mesogens to be alignment-processed by UV light irradiated thereto. However, the present invention is not limited to this. That is, reactive mesogens may be deposited onto one of the first and second substrates, and may be irradiated with UV light thus to be alignment-processed. And, an alignment layer such as polyimide or polyamide may be formed on another substrate, and then may be rubbed, thereby alignment-processing the alignment layer. Namely, an alignment layer formed of reactive mesogens or an alignment layer formed of polyimide may be implemented according to an LCD device to be fabricated.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method of fabricating a liquid crystal display (LCD) device, the method comprising:
   providing a first substrate including a plurality of pixels defined by a plurality of gate lines and data lines and thin film transistors (TFTs) arranged at each of the pixels;
   forming a first alignment layer on the first substrate;
   alignment-processing the first alignment layer;
   providing a second substrate having a color filter layer and a black matrix thereon;
   forming a second alignment layer on the second substrate;
   alignment-processing the second alignment layer; and
   attaching the first and second substrates to each other, wherein at least one of the first and second alignment layers is formed of an alignment material including reactive mesogens and a photoinitiator, the reactive mesogens having a mesogen, flexible spacers at ends of the mesogen, and photo-reactive end groups at ends of the flexible spacers, and at least one of the first and second alignment layers is aligned by irradiating UV light in a state that an electric field has been applied to the alignment layer in a predetermined direction, wherein the electric field is applied to the first substrate by applying a voltage between an odd numbered gate line and an even numbered gate line formed on the first substrate to generate an electric field between the odd numbered gate line and the even numbered gate line caused by a voltage difference, thereby the reactive mesogens and the photoinitiator are polymerized to form a polymer network in vertical direction of the electric field.

2. The method of claim 1, wherein the electric field is applied to the second substrate by applying a voltage to an odd numbered voltage apply line and an even numbered voltage apply line arranged in the regions of the second substrate corresponding to the gate lines of the first substrate to generate the electric field between the odd voltage apply line and the even numbered voltage apply line caused by the voltage difference, thereby the reactive mesogens and the photoinitiator are polymerized to form a polymer network in vertical direction of the electric field.

3. The method of claim 2, wherein the voltage apply lines are formed below or above the black matrix.

4. The method of claim 2, wherein the voltage apply lines are formed of a transparent conductive material or an opaque metallic material.

5. The method of claim 2, further comprising;
  forming a third connecting line connected to the odd numbered voltage apply line;
  forming a third pad connected to the third connecting line to apply the voltage to the odd numbered voltage apply line through the third connecting line;
  forming a fourth connecting line connected to the even numbered voltage apply line; and
  forming a fourth pad connected to the fourth connecting line to apply the voltage to the even numbered voltage apply line through the fourth connecting line.

6. The method of claim 1, further comprising:
  at least one pair of common electrodes and pixel electrodes arranged in the pixel in parallel with each other to generate a horizontal electric field parallel to a surface of the first substrate; and
  a common line on the first substrate, the common line being connected to the common electrode to apply a signal to the common electrode.

7. The method of claim 6, wherein the electric field is applied to the first substrate by applying a voltage between an odd numbered common line and an even numbered common line.

8. The method of claim 1, further comprising;
  forming a first connecting line connected to the odd numbered gate line;
  forming a first pad connected to the first connecting line to apply the voltage to the odd numbered gate line through the first connecting line;
  forming a second connecting line connected to the even numbered gate line; and
  forming a second pad connected to the second connecting line to apply the voltage to the even numbered gate line through the second connecting line.

* * * * *